Sept. 6, 1927.

F. URBAN

SPHERICALLY, CHROMATICALLY, AND ASTIGMATICALLY CORRECTED
THREE-LENS CEMENTED OBJECTIVE

Filed Dec. 21, 1923

1,641,402

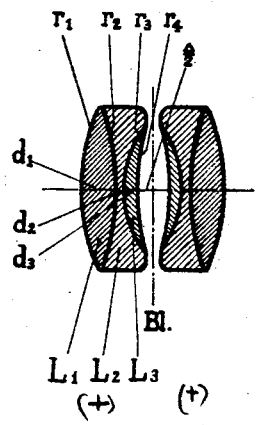

$$L^1 \begin{matrix} r^1 = +19.5 \\ r^2 = \pm 28.2 \end{matrix} \quad d^1 = 3.4 \quad n^D = 1.6584 \quad n^G = 1.6825$$

$$L^2 \; r^3 = \mp 10 \quad d^2 = 0.8 \quad n^D = 1.5991 \quad n^G = 1.6196$$

$$L^3 \; r^4 = -23 \quad d^3 = 1.4 \quad n^D = 1.4634 \quad n^G = 1.4723$$

$$\frac{\Delta}{2} = 1.6$$

Image angle about 100°   Aperture ratio 1:9
Focal lenght 100

Inventor:
Franz Urban
by Leo J. Matty atty.

X — One comp plural element

Patented Sept. 6, 1927.

1,641,402

UNITED STATES PATENT OFFICE.

FRANZ URBAN, OF BERLIN-STEGLITZ, GERMANY, ASSIGNOR TO THE FIRM OF OPTISCHE ANSTALT C. P. GOERZ AKTIENGESELLSCHAFT, OF FRIEDNAU, NEAR BERLIN, GERMANY.

SPHERICALLY, CHROMATICALLY, AND ASTIGMATICALLY CORRECTED THREE-LENS CEMENTED OBJECTIVE.

Application filed December 21, 1923, Serial No. 681,918, and in Germany December 29, 1922.

A more or less pronounced disadvantage of such wide-angle objectives is their comparatively low luminosity.

The present invention aims at obviating this disadvantage by providing a particular construction comprising a meniscus on the side of the diaphragm and with its concave surface facing the latter, a central by-concave lens and an outer bi-convex lens, the two last-mentioned lenses being of material having a higher refractive index than that of the meniscus.

According to this invention the bi-concave lens is made of flint glass of high refractive index, the refractive index difference between the said lens and the meniscus being very wide, and at least 0.1. The convex lens is made of baryta flint and has a higher refractive and a higher dispersive power than the glass of the central bi-concave lens; the refraction index difference of these two lenses being however smaller than that between the refraction index of the central bi-concave lens and of the meniscus.

The above-described combination of glasses of dissimilar nature in a known kind of objective has the advantage of rendering comparatively small the strong marginal astigmatic defects in wide-angle images without detrimentally increasing these defects for acute-angle images.

There is no difficulty in making a double objective with the objective according to the invention for image angles of over 100° with satisfactory correction and for an aperture ratio of 1:9.

A constructional example of the objective according to the invention is illustrated in the accompanying drawing. The thickness of the lenses $L^1$, $L^2$, $L^3$ is $d^1$, $d^2$, $d^3$ respectively and the radii of curvature of the lens surfaces are, in sequence, $r^1$, $r^2$, $r^3$, $r^4$. The diaphragh is $B^1$ and the distance between the latter and the concave surface of the meniscus is $\frac{\Delta}{2}$.

In a construction of the objective, the constants for a focal length of $f-100$ are as follows:

$L^1 \begin{matrix} r^1 = +19.5 \\ r^2 = \pm 28.2 \end{matrix} d^1 = 3.4 \, n_D = 1.6584 \, n_G = 1.6825$ $L^2 \, r^3 = \mp 10 \quad d^2 = 0.8 \, n_D = 1.5991 \, n_G = 1.6196$ $L^3 \, r^4 = -23.4 \, a^3 = 1.4 \, n_D =$ $$1.4634 \, n_G - 1.4723 \, \frac{\Delta}{Z} - 1.6$$

Image angle about 100°. Aperture ratio 1:9.

What I claim is:

1. A cemented photographic three-lens objective corrected spherically, chromatically and astigmatically and constituted by (1) a positive meniscus adjacent to the diaphragm and with a concave surface facing the latter, (2) a central bi-concave lens of highly refractive flint glass the refractive index of which is higher by at least 0.1 than that of the meniscus and (3) a bi-convex lens, having a higher refractive index and higher dispersive power than the glass of the bi-concave lens the refraction index difference between the said central biconcave lens and the meniscus being greater than that between the central bi-concave lens and the biconvex lens of the objective.

2. A double objective comprising two cemented three-lens elements each spherically, chromatically and astigmatically corrected and constituted by (1) a positive meniscus adjacent to the diaphragm and with a concave surface facing the latter, (2) a central bi-concave lens of highly refractive flint glass the refractive index of which is higher by at least 0.1 than that of the meniscus and (3) a bi-convex lens, having a higher refractive index and higher dispersive power than the glass of the bi-concave lens the refraction index difference between the said central biconcave lens and the meniscus being greater than that between the central biconcave lens and the biconvex lens of the objective.

In testimony whereof I have signed this specification.

FRANZ URBAN.